June 12, 1951

A. H. DE ROCHER 2,556,996

FRUIT JUICE EXTRACTOR

Filed Aug. 21, 1946

Inventor
ARTHUR H. DE ROCHER
by
Attys

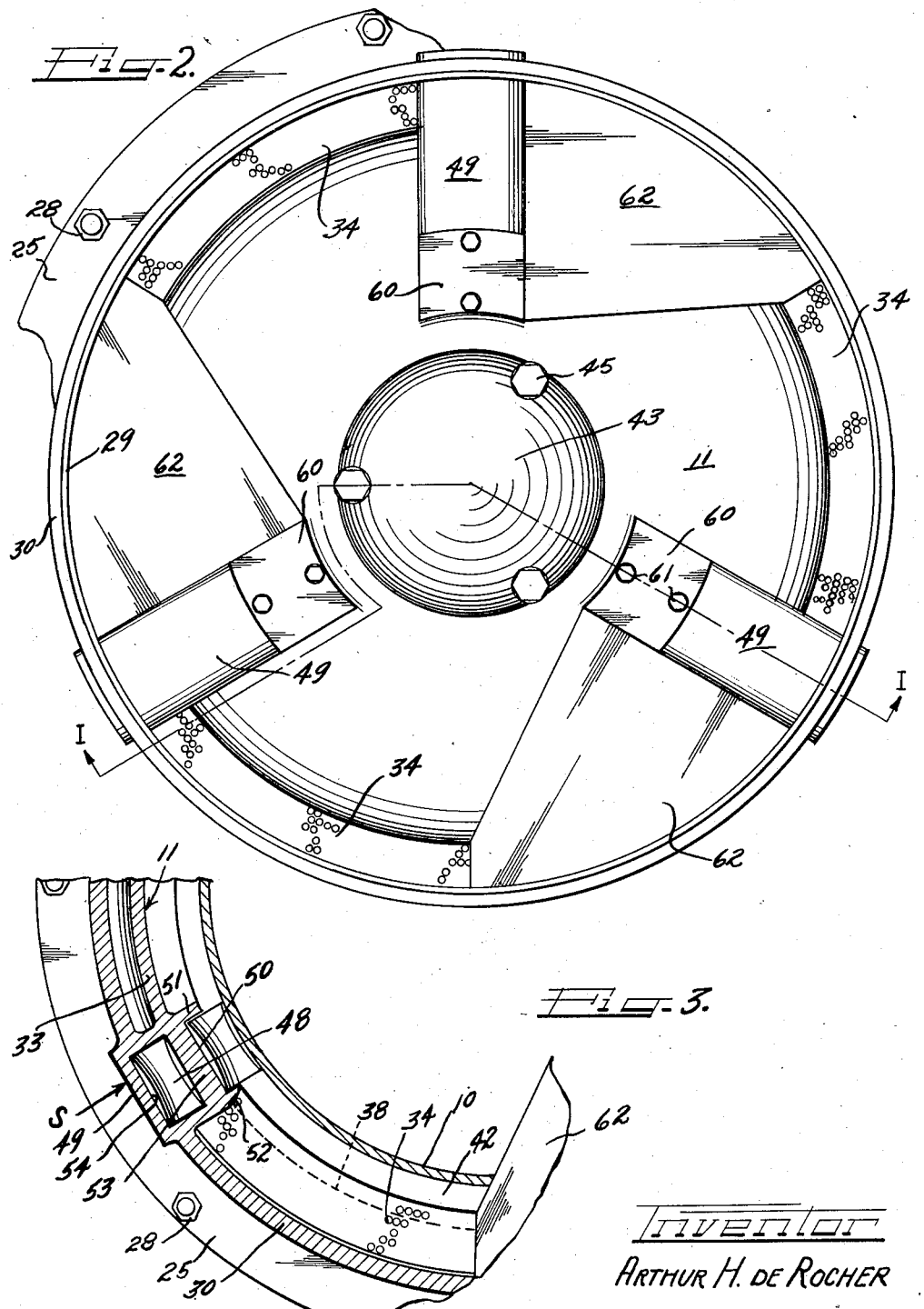

Patented June 12, 1951

2,556,996

UNITED STATES PATENT OFFICE 2,556,996

FRUIT JUICE EXTRACTOR

Arthur H. de Rocher, Honolulu, Territory of Hawaii

Application August 21, 1946, Serial No. 691,934

16 Claims. (Cl. 100—48)

This invention relates to an improved juice extractor or the like and more particularly to a novel device for expressing the liquid content of fruit or other liquid bearing materials and which is especially suitable for handling pineapple cores and trimmings to derive the juice therefrom.

A principal source of pineapple juice is from the cores and trimmings resulting from canning fresh ripe pineapples. Heretofore the usual method of extracting the juice has been first to grind up the pineapple cores and fruit trimmings and then to run the ground material through centrifugal extractors or strainers of various types. The grinding, however, reduces the fiber in the fruit to such fine particles that clarification of the juice to remove the high percentage of entrained fine fibers is quite difficult and is a large factor in the cost of producing marketable pineapple juice. This is also true of various other types of fruits or other materials supplying juice.

An important object of the present invention is to afford an improved method and means for extracting the juice from fibrous material such as pineapple cores and trimmings without previous grinding and substantially free from entrained fiber.

Another object of the invention is to improve the extraction of fruit juice to attain greater efficiency both in the speed and rate of production and improvement in the quality of the juice.

A further object of the invention is to provide improved apparatus for extracting fruit juice or the like which is adapted for continuous operation with a high degree of efficiency and wherein the pulp is quite thoroughly pressed free from juice in such a manner that the juice is virtually free from entrained fiber.

Still another object of the invention is to provide a juice extractor wherein material is pressed to remove the juice therefrom by being forced in one direction through the apparatus while the juice travels in substantially the opposite direction.

It is also an object of the invention to provide an improved fruit juice extracting machine in which the juice is pressed from the pulp in a novel manner and separated by force of gravity as a continuous process.

Yet another object of the invention is to provide an improved machine for expressing fruit juice or the like having improved means for charging the same.

Still another object of the inventon is to provide improved means in a continuous fruit press of the foregoing general character for disposing of the expressed pulp.

Another object resides in the provision of a high capacity fruit juice extracting machine which comprises relatively few and easily manufactured parts of rugged characteristics and high efficiency.

Other objects, features and advantages of the present invention will become readily apparent from the following detailed description of a preferred embodiment of the invention, taken in conjunction with the accompanying two sheets of drawings, in which:

Figure 2 is a top plan view of the machine; and

Figure 3 is a fragmentary detail sectional view taken substantially on the line III—III of Figure 1.

Figure 1:
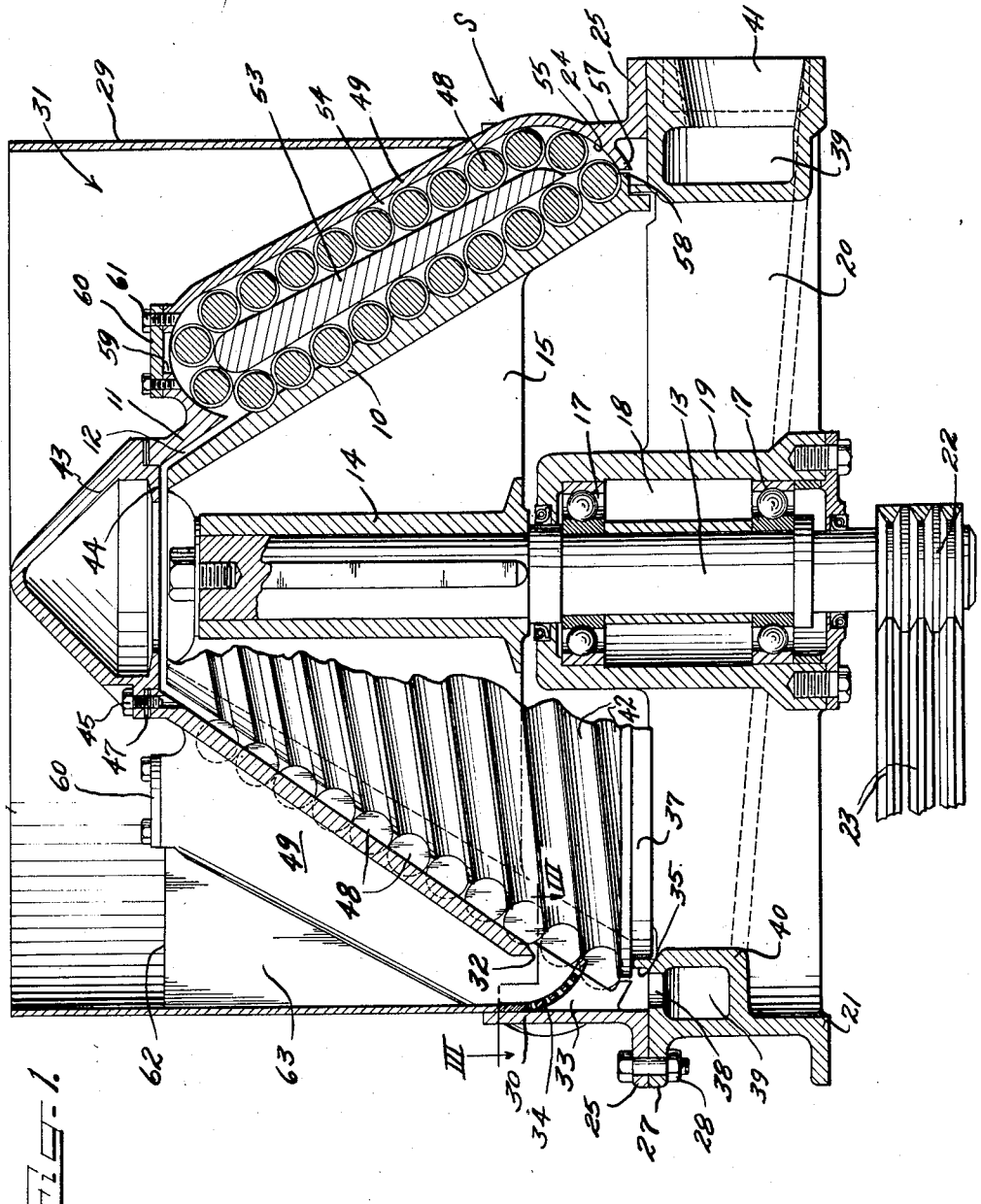
Figure 1 is a vertical sectional view through a fruit juice extracting machine embodying the features of the invention, and taken substantially on the line I—I of Figure 2.

A machine embodying the features of the present invention is especially well adapted for handling pineapple cores and trimmings efficiently in large volume and to produce juice which is of unusual clarity so that it need not necessarily go through a clarification process. This is accomplished by expressing the juice from the cores and trimmings without grinding so that there are no fibers of such shortness or small size as to be carried off or entrained in the expressed juice. In accomplishing this, the material to be extracted is moved upwardly as the pressing progresses and the expressed juice is permitted to travel gravitationally downwardly away from the material which is gradually pressed out to mere pulp and ejected continuously and automatically from the machine entirely remote from the juice.

This improved process is adapted to be carried out by the novel machine shown in the drawings which includes a hollow rotor 10 cooperatively surrounded by a presser housing 11 defining therebetween an annular pressing chamber 12. In a preferred form the rotor 10 and the housing 11 are of generally conical shape. Such shape may be varied widely to cylindrical or even to inverted cone shape, if conditions necessitate.

Means for driving the rotor 10 comprise an axial, vertical shaft 13 having its upper end portion keyed within an elongated hub 14 rigid with the rotor 10 through the medium of vertical radial spider vanes 15.

At its lower end portion the shaft 13 is mounted rotatably by means of axially spaced pairs or ring bearing assemblies 17 which also serve as thrust bearings and are mounted within a sealed lubricating chamber 18 provided interiorly of a stationary chambered hub 19 of a spider 20. A ring-shaped base 21 integral with the spider 20 supports the assembly.

Means for driving the shaft 13 rotatably may comprise a sheave or pulley 22 secured to its lower extremity and connected to a source of power as by means of endless flexible belts 23.

By preference, the ring base 21, together with the hub 19 and spider 20 comprises an integral casting which provides a rugged and durable structure. Likewise, the rotor 10 together with the spider means 15 and the hub 14 may be formed as a one-piece casting. Also the presser housing 11 may be formed as a casting formed with a base 24 having a radial lateral base flange 25 seating on a complementary flange 27 of the upper side of the base 21 and secured thereto in any suitable fashion as by means of screws or bolts 28.

In the present instance, wherein the rotor 10 and the presser housing 11 are formed substantially frustoconically, an upright tubular wall member 29 fits in telescoped relationship within the upper end of a tubular flange 30 rising integrally from the base 24. This provides the outer wall of a hopper space 31, the inner wall of which comprises the exterior of the presser housing 11. Into this hopper 31 fruit pieces, such as cores and trimmings of pineapple, are adapted to be dumped for pressing.

According to the present invention, the material to be pressed is fed into the pressing chamber 12 adjacent to the bottom of the rotor 10 and is forced upwardly within the pressing chamber for expressing of the juice therefrom, while the extracted juice flows gravitationally down through the chamber and clear of the base of the rotor. Accordingly, the lower end of the presser housing 11 inwardly of the upstanding flange 30 is formed with a plurality of inlets, charging or feed openings 32 formed as horizontal slots close to the lower end portion of the rotor 10. In the embodiment of the invention shown in the drawings, three of the feed openings 32 are provided, each separated from the adjacent opening by a solid portion 33. Herein, the openings 32 are wide enough and long enough to accommodate full length pineapple cores.

Within the lower part of each of the openings 32 is a downwardly and inwardly curved screen 34 carried by the inner face of the cylindrical hopper flange 30 affording a baffle for directing material to be pressed toward the rotor 10. These screens are strong enough to withstand the substantial pressure to which the material in the hopper 31 may be subjected by any suitable forcing means. The extracted juice may pass freely down through the screens 34, but since the screens are secured fixedly against the flange 30 and have their inner edges closely adjacent to the rotor 10, the material to be pressed cannot escape downwardly thereby.

Under the screens 34 and underlying the lower rim of the rotor 10 within an annular undercut rabbet groove 37 provided therein is an annular liquid collecting trough 35. Elongated slots 38 afford communication between the base of the trough 35 and an underlying annular collecting chamber 39 provided within an integral housing structure on the base 21 and enlarging with appropriate drainage slope toward an outlet or drainage port 41, in the present instance opening radially from the base 21.

At the feed openings 32 the material to be pressed is gathered in one or more relatively deep, and in this instance, spiral grooves 42. For a high capacity pressing machine as shown herein, three such grooves 42 are preferred. Where, as in the present instance, the rotor 10 is driven clockwise, or to the left as seen in Figure 1, the spiral grooves 42 run counter-clockwise thereabout.

Stop means are provided at the leading side of each of the feed openings 32 considered with respect to the direction of rotation of the rotor 10 for intercepting the material in the grooves 42 and holding such material against rotation with the rotor 10. Thereby, the material must follow the ascending spiral of the respective grooves 42 in which it is lodged, so that as the rotor rotates continuously the material is carried gradually toward the top of the rotor within the pressing chamber 12. As the material is thus carried up, it is gradually subjected to increasing pressure between the rotor 10 and the presser housing 11 by having the opposing surfaces of the rotor and the presser housing gradually converging toward a narrow spacing at the top of the rotor, and also by having the spiral grooves 42 gradually diminish in depth from the bottom to the top of the rotor adjacent the top of the rotor 10, the grooves 42 merging into the conical surface of the rotor.

As the pressure on the material increases and the juice is expressed therefrom, the juice runs down the rotor, finding channels in the material or passing by the trailing sides of the masses of material and runs off through the screens 34 into the trough 35.

As the pressed pulp reaches the top of the rotor 10, it is diverted inwardly over the top edge of the rotor to drop thereinto and down through the spider vane 15 and the spider 20 into any suitable collecting receptacle. It will be seen from Figure 1 that the space within the rotor 10 and within the base 21 rapidly enlarges from the top of the rotor and is therefore quite capable of providing ample passage for the expressed pulp dropping down therethrough without any danger of clogging.

In the present instance the means for diverting the expressed pulp inwardly is a cap 43 which has a radially inwardly extending diverting flange 44 overlying the upper edge of the rotor 10 and affording a baffle across the top of the pressing chamber 12.

By preference the baffle flange 44 is so disposed with respect to the upper edge of the rotor 10 that a certain amount of back pressure is maintained upon the ascending mass of pressed pulp. This supplements the lateral liquid-expressing pressure to which the pulp is subjected in the converging opposed walls of the rotor 10 and the presser housing 11. For adjustment of this back pressure, the cap 43 is constructed to be removably secured to the upper end of the housing 11 as by means of screws 45, and one or more shims or washers 47 is adapted to be interposed between the cap and the end of the housing 11 in such thickness as will provide the desired adjusted spacing between the baffle flange 44 and the adjacent upper end of the rotor 10. The interior of the cap 43 is preferably hollow to afford pressure relief, while the external form of the cap is preferably substantially conical in order to complement the generally conical form of the exterior of the housing 11 and prevent material which is dumped into the hopper 31 from catching thereon.

According to the present invention, the means for stopping the material to be pressed from rotating with the rotor 10 comprise what may be referred to as live stops constructed and arranged to cooperate with the rotor not only to stop the material and confine it to particular expressing zones, but also to act with the material to assist it upwardly through the diminishing pressing chamber 12 as the juice is squeezed from the material. There are as many of the stops as the number of the grooves 42, herein three in number. Each of the live stops comprises a train of stop elements, in the present instance rollers 48 confined by respective generally vertical housings 49 to travel endless cyclical paths up along the rotor 10 within the grooves 42 and then return to repeat the cycle.

As best seen in Figure 3, the rollers 48 are of substantially hour glass shape, that is, they are elongated and have the center portions thereof substantially constricted in such a manner that the edges of the rollers make contact within the spiral grooves 42 with the peripheries of the roller edges substantially complementary to the curvature of the grooves 42. The ends of the rollers which oppose the material to be pressed enter into substantial blocking engagement to the material and thus effectually hold the material against rotary movement with the rotor. At the same time, however, the rollers 48 advance upwardly along the rotor 10 with the material and thus assist in advancing the material upwardly under expressing pressure in the pressing chamber 12.

By preference, each of the housings 49 is formed integral with the presser housing 11 and provides a roller guiding channel 50 opposing the rotor 10. In order to hold the rollers 48 against the substantial thrust exerted axially thereagainst by the stopped material undergoing pressing, the channel 50 is formed with a substantial thrust flange 51, while at the opposite side of the channel a retainer flange 52 is provided which is relatively narrow so that its inner edge coincides with the inner face of the presser housing 11 and the material opposing ends of the rollers 48 are freely exposed to the full working depth of the pressing chamber 12.

Longitudinally of each of the housings 49 is integral longitudinal partition 53 which affords with the outer wall of the housing 49 a return chute or duct 54 for the rollers 48 which have completed the working reach of their operating cycle. As best seen in Figure 1, the upper end of the partition 53 is preferably rounded off, complementary to the opposing interior wall of the housing 49 which is also rounded off so as to form a free return guide for the rollers 48 at the upper end of the working reach to divert the rollers into the return chute 54. At its lower end, the partition 53 is also shaped substantially complementary to the lower end of the housing 49 which is formed with a rounded sloping guide surface 55 which sweeps toward the lower edge of the rotor 10 and terminates in a lip 57 closely approaching and at the same elevation as an annular lip 58 on the rotor base. The lip 58 defines the upper side or overhang of the undercut groove 37 and provides the starting base for the spiral grooves 42 into which the rollers 48 drop respectively at the start of their working reach. It will thus be apparent that the stop rollers 48 freely travel a continuous circuit through their respective housing 49, being driven upwardly in the working reach by the screw action of the grooves 42 in the rotation of the rotor and then returning freely within the housings 49 to the start of the operating circuit.

For convenience in loading the stop rollers 48 into the respective housings 49, each of the housings may be formed at its upper end with a loading aperture 59 which is adapted to be closed by a cover plate 60 held in place by appropriate screws 61.

In order to direct material within the hopper 31 efficiently to each of the pressing zones within the extractor and also to avoid pockets within which some of the material may stagnate, baffles 62 are provided which extend from the upper ends of the respective stop housings 49 obliquely down to the adjacent end of the screen 34 at the feed slot in each of feeding sections into which the hopper 31 is divided by the housings 49. An shown in Figure 1, each of the baffles 62 may be formed with a vertical closure portion 63 to close the space therebehind between its upper edge and the outer sloping wall of the adjacent housing 49. Thus, when the hopper 31 is loaded with material such as fruit to be pressed, the outer sloping walls of the housing 11 and the baffles 62 cooperate to direct and concentrate the material at the feed slots 32 where the material is picked up by the spiral grooves 42 and carried up through the pressing chamber 12. Upon reaching the top of the pressing chamber, the pressed material is diverted inwardly over the top edge of the rotor so as to drop down through the spider 20 into a suitable collecting receptacle.

The fruit pieces are pressed with a vertical freedom from cutting action, and by having the elements constituting the pressing chamber 12 smoothly finished the fruit pieces encounter a minimum of abrasion such as might cause breaking down of the fiber thereof. As a result the extracted juice will be virtually free from entrained fiber. This is of substantial importance in the production of marketable fruit juice, and especially pineapple juice which is somewhat viscous and therefore offers a substantial problem in this respect.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a fruit juice extractor, a vertically disposed rotor having an ascending spiral groove formation thereon, the upper end of the rotor being open and the rotor affording vertical passage therethrough, a presser housing surrounding the rotor and cooperating therewith to press juice from material driven upwardly therebetween by the rotor, and a cap on said housing overlying the upper end of the rotor and serving as a deflector for expressed pulp for diverting the expressed pulp into the open end of the rotor.

2. In combination in a fruit juice extractor, a vertically disposed rotor having an ascending spiral groove formation thereon, the upper end of the rotor being open and the rotor affording vertical passage therethrough, a pressure housing surrounding the rotor and cooperating therewith to press juice from material driven upwardly therebetween by the rotor, and a cap on said housing overlying the upper end of the rotor and serving as a deflector for expressed pulp for diverting the expressed pulp into the open end of the rotor, said cap having a hollow pressure relief space therein and including a radial inwardly extending baffle flange adjustably overlying the upper edge of the rotor.

3. In combination in a fruit juice extractor, a rotor having an ascending spiral groove formation thereon, a presser housing surrounding said rotor and cooperating therewith to press the juice from fruit material driven upwardly therebetween by said spiral groove formation, means for charging the space between the rotor and housing in a plurality of zones adjacent the bottom of the rotor, and stop means cooperating with the rotor at the leading sides of said zones to hold the material against rotation with the rotor as the spiral groove formation works the material upwardly to be expressed.

4. In combination in a fruit juice extractor of the character described, a rotor mounted for rotation on a vertical axis and having a spiral groove formation on the periphery thereof, a presser housing cooperating with the rotor and affording a gradually upwardly diminishing pressing chamber in cooperation with the rotor, and means dividing said chamber into a plurality of pressing zones and comprising live stop structure adapted to run in said spiral groove formation, said live stop structure including respective trains of stop rollers and structure for guiding the rollers in a working cycle of movement as impelled by the screw action of said spiral groove formation.

5. In combination in a fruit juice extractor of the character described, a rotor mounted on a vertical axis and having a peripheral spiral groove formation, a presser housing surrounding the rotor cooperatively and affording with the rotor a gradually upwardly diminishing expressing chamber, the rotor being adapted to drive material to be expressed upwardly within the expressing chamber, and a plurality of live stops comprising rollers of substantially hour-glass shape designed for upward travel along the rotor by following said spiral groove formation and adapted to hold the material to be expressed within predetermined pressing zones.

6. In combination in a fruit juice extractor of the character described, a vertically disposed rotor having a spiral groove formation on the periphery thereof, a housing surrounding said rotor and cooperating therewith to provide a gradually upwardly diminishing pressing chamber, stop means dividing said chamber into a plurality of pressing zones, said housing having a charging opening adjacent to the bottom of each of said pressing zones, means for collecting expressed juice below said charging openings, and baffle screens cooperating with said openings for directing material therethrough and affording passage for expressed juice to said collecting means.

7. In combination in a fruit juice extractor of the character described, a base, a rotor, means carried by said base for rotatably supporting said rotor on a vertical axis, a presser housing carried by said base and surrounding said rotor, said rotor having a spiral groove formation of substantially diminishing depth toward the top of the rotor, said housing cooperating with said rotor to provide a pressing chamber of gradually diminishing spacing toward the top of the rotor, said rotor and said base affording an internal passage from the top of the rotor downwardly for expressed pulp falling therethrough during operation of the rotor, and a juice collecting structure on said base below said rotor including an annular trough below the lower edge of the rotor.

8. In a fruit juice extractor of the character described, a housing, a rotor within said housing cooperating with the housing to provide a pressing chamber within which material to be expressed is driven upwardly, charge openings at the lower end of said housing, means dividing the pressing chamber into a plurality of pressing zones corresponding to said charge openings, a hopper structure surrounding said housing for receiving the material to be charged into said pressing chamber, and baffle structure within the hopper for directing material to said openings.

9. In combination in a juice extractor of the character described, a hollow vertically disposed open end rotor having a spiral groove formation on the periphery thereof, a presser housing cooperatively surrounding said rotor and adapted to press juice from material and reduce the latter to expressed pulp as it is worked upwardly by the groove formation in rotation of the rotor, and means at the upper end of the rotor for supplying back pressure to the ascending pulp and constructed and arranged to divert the expressed pulp into the open end of the rotor to drop down therethrough.

10. In combination in a juice extractor of the character described, a pair of hollow upright members one within the other and having opposing walls of gradually diminishing spacing from the bottom to the top, said walls having means between them for constraining juice bearing material fed between them at the bottom of said spacing so as to move the material upwardly between said walls and press juice from the material while it is moving upwardly between the members, the arrangement being such that the expressed juice flows by gravity downwardly, the inner one of the members being open at the top, and means at the top of said members for directing the pressed pulp remaining from said material into the open top of the inner one of the members.

11. In combination in a fruit juice extractor, a base member comprising a spider structure including a central hub, a presser housing supported by the base member, a shaft rotatably carried by said hub and extending upwardly within the presser housing, a hollow rotor including a supporting spider structure carried by said shaft and disposed in pressing relation to the interior of the presser housing, the upper end of the rotor being open, means for feeding material to be pressed between the lower portions of the presser housing and the rotor, the construction and arrangement of the rotor and presser housing being such that in operation the material is carried upwardly as it is pressed, means on the base for receiving expressed juice, and means at the top of the presser housing for directing the pressed pulp into the open upper end of the rotor to drop down through the interior thereof past the spider structure of the rotor and down through the spider structure of the base.

12. In combination in a juice extractor of the character described, a rotor having a spiral groove formation on the periphery thereof, a presser housing cooperating with the rotor and providing a pressing chamber thereabout, and a live stop structure for holding material to be pressed in a pressing zone wherein the material is carried longitudinally between the rotor and presser housing by action of the spiral groove formation but is held against rotation with the rotor, said live stop structure comprising a train of individual stop rollers and means for guiding the rollers in a working cycle of movement as impelled by the screw action of said spiral groove formation.

13. In combination in a juice extractor of the character described, a rotor having a spiral groove therein, a housing structure cooperating in pressing relation with the rotor, a train of individual stop rollers riding in said groove, and means confining the rollers to travel an endless cyclical path comprising a roller housing on said housing structure having a return duct which at one end receives the rollers from said groove and at the other end returns the rollers to the groove.

14. In combination in a juice extractor of the character described, a rotor having a spiral groove therein, a housing structure cooperating in pressing relation with the rotor, a train of individual stop rollers riding in said groove, and means confining the rollers to travel an endless cyclical path comprising a roller housing on said housing structure having a return duct which at one end receives the rollers from said groove and at the other end returns the rollers to the groove, said roller guide housing having an access opening therein for loading of the rollers thereinto or removal of the rollers therefrom and a removable closure over said opening.

15. In combination in a fruit juice extractor of the character described, a vertically disposed rotor, a stationary housing cooperating with said rotor and affording therewith a pressing chamber, means in said pressing chamber operative during the rotation of the rotor relative to the housing for pressing juice from material fed into the housing, said housing completely enclosing the rotor and having a material feed opening from the outer side therethrough to the interior adjacent to the lower end of the rotor, and a hopper structure surrounding the housing and defining with the housing a receptacle for receiving material to be pressed by entry from the receptacle through the feed opening into the pressing chamber.

16. In a juice extractor of the character described, a generally conically shaped housing, a hollow rotor within said housing cooperating with the interior of the housing to provide a pressing chamber within which material to be expressed is driven upwardly, a charge opening at the lower end of the housing, a hopper structure surrounding the housing and cooperating with the housing to provide a receptacle for material to enter from the receptacle through the charge opening into the pressing chamber, the upper end of the rotor being open to receive pulp from which the juice has been expressed, and means below the lower end of the rotor for receiving juice expressed from the pulp.

ARTHUR H. DE ROCHER.

REFERENCES CITED

The following references are of record in the file of this patent:

UNITED STATES PATENTS

| Number | Name | Date |
| --- | --- | --- |
| 108,645 | Smith | Oct. 25, 1870 |
| 366,165 | Gray | July 5, 1887 |
| 1,076,995 | Renneburg | Oct. 28, 1913 |
| 1,151,186 | Johnson | Aug. 24, 1915 |
| 1,290,734 | Goodhue | Jan. 7, 1919 |
| 1,530,759 | Coleman | Mar. 24, 1925 |
| 2,246,045 | Hirschberg | June 17, 1941 |

FOREIGN PATENTS

| Number | Country | Date |
| --- | --- | --- |
| 615,324 | France | Oct. 9, 1926 |